(12) United States Patent
Imago

(10) Patent No.: US 7,836,035 B2
(45) Date of Patent: Nov. 16, 2010

(54) METHODS AND SYSTEMS FOR PROVIDING ONLINE INFORMATION FOR NETWORKED DEVICES

(75) Inventor: Satosi Imago, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1252 days.

(21) Appl. No.: 11/135,060

(22) Filed: May 23, 2005

(65) Prior Publication Data
US 2005/0228869 A1    Oct. 13, 2005

Related U.S. Application Data

(63) Continuation of application No. 10/184,449, filed on Jun. 28, 2002, now Pat. No. 6,941,277.

(30) Foreign Application Priority Data

Jul. 6, 2001 (JP) .............................. 2001-205520

(51) Int. Cl.
G06F 7/00 (2006.01)
G06F 17/30 (2006.01)
(52) U.S. Cl. .................................... 707/705
(58) Field of Classification Search ................. 707/705, 707/999.01
See application file for complete search history.

(56) References Cited

U.S. PATENT DOCUMENTS 5,950,173 A * 9/1999 Perkowski .................... 705/26
6,308,205 B1 * 10/2001 Carcerano et al. ........... 709/221
6,831,757 B1    12/2004 Terao

FOREIGN PATENT DOCUMENTS

| JP | 5-324507 | 12/1993 |
|---|---|---|
| JP | 5-324507 A | 12/1993 |
| JP | 11-73381 A | 3/1999 |
| JP | 11-341199 A | 12/1999 |
| JP | 2000-174947 A | 6/2000 |
| WO | 01/37181 A2 | 5/2001 |

OTHER PUBLICATIONS

JP Office Action with English Summary for JP Application No. 2001-205520 mailed on Sep. 14, 2009 (5 pages).

* cited by examiner

*Primary Examiner*—John E Breene
*Assistant Examiner*—Aleksandr Kerzhner
(74) *Attorney, Agent, or Firm*—Knoble Yoshida & Dunleavy, LLC

(57) ABSTRACT

Online information is centrally stored for various devices, and the online information includes reference manual and related information such as related products, new products and maintenance information. The online information is retrieved from a user display unit that is either independent or is incorporated in the device. The online information is selected from a list of devices that is connected to the network. The online information is also further searched based upon a key that a user specifies.

6 Claims, 8 Drawing Sheets

FIG. 2

| PRODUCT TYPE | PRODUCT NAME | MANUFACTURER NAME | DEVICE CODE | MANUFACTURER CODE |
|---|---|---|---|---|
| WASHING MACHINE | PRODUCT NAME1 | COMPANY A | 123456 | MakerA.com |
| MICROWAVE OVEN | PRODUCT NAME2 | COMPANY B | abcdefg | MakerB.com |
| ... | ... | ... | ... | ... |

- 23: PRODUCT TYPE
- 21: PRODUCT NAME
- 22: MANUFACTURER NAME
- 24: DEVICE CODE
- 25: MANUFACTURER CODE

DEVICE SELECTION INFORMATION GROUP: columns 23, 21, 22
SEARCH KEY INFORMATION GROUP: columns 24, 25

| MANUFACTURER CODE | DEVICE CODE | WHOLE MANUAL | 1ST PARTIAL MANUAL | 2ND PARTIAL MANUAL | NTH PARTIAL MANUAL ... |
|---|---|---|---|---|---|
| Maker A.com | 1234546 | | | | ..... |
| Maker B.com | abcdefg | ..... | ..... | ..... | ..... |
| ..... | ..... | ..... | ..... | ..... | ..... |

FIG. 5

METHODS AND SYSTEMS FOR PROVIDING ONLINE INFORMATION FOR NETWORKED DEVICES

This is a continuation of prior application Ser. No. 10/184,449 filed on Jun. 28, 2002 now U.S. Pat. No. 6,941,277 under 37 CFR 1.53(b)

FIELD OF THE INVENTION

The current invention is generally related to a method of and a system for searching information in reference manuals, and more particularly related to the method and the system for searching via the Internet information in the manuals and for displaying the searched information. For example, when malfunctions occur in the office environment, the manuals contain information on the devices such as copiers and printers that are connected to a local area network. Similarly, when it is not clear how to operate a particular appliance at home, the manual contains information on appliances.

BACKGROUND OF THE INVENTION

Japanese Patent Publication Hei 5-324507 discloses "an online manual reference system" that stores online manual for devices. The same prior art reference also discloses a method of accessing the online manual reference system via network and referring to a corresponding online manual. That is, a unit for displaying a user an online manual stores network addresses of the devices that are connected to the network. Using a corresponding network address, the unit transmits a specified device a request for transmitting an online manual based upon user instructions. Upon receiving the above transmission request, the device responds to the requesting unit by retrieving the requested online manual from its memory storage unit.

In summary, the above online manual display technologies in Japanese Patent Publication Hei 5-324507 indicate the integrated displaying operation of online manuals for a plurality of devices that is connected to the network. In displaying the manuals, the above technologies place the online manuals in a plurality of separate multiple windows. The above prior art online manual displaying method and system require that the manuals are locally stored in the devices. To locally store the manuals, each device must own an additional storage unit such as read-only memory (ROM) or a hard disk. The additional storage unit undesirably increases the manufacturing cost of the devices or appliance.

Furthermore, the manufacturing plan may be delayed by the completion of the manuals since the manuals have to be stored in each device. In other words, although the device manufacturing process and the manual generation process take place in parallel, if the manual is not completed, the device manufacturing process is also not completed. As a result of the above dependency, the manufacturing process may be undesirably extended.

In addition, it is hard to revise the internally stored manuals. In some instances, the revisions are necessary for errors or additional information. In other instances, the revisions are necessary to update the information over time. For example, when a customer service telephone number is changed after the first shipment of the devices, it is difficult to change the telephone number that is internally stored in the device.

Lastly, it is also hard in the prior art technology to display information form a plurality of sources. In displaying a device manual, it is desirable to display information that is related to the device. For example, the related information includes recall notices and safety information that had become available after the sales. The related information is displayed in the same screen where the manual is displayed for promoting the user safety. The additional information also includes related services and products that can be displayed.

The above described difficulties remain as issues and should be improved.

SUMMARY OF THE INVENTION

In order to solve the above and other problems, according to a first aspect of the current invention, a system for connecting various elements via a network including: devices connected to the network for each storing device information; a manual display device connected to the network for requesting to the devices the device information; the manual display device receiving the device information from the devices; the manual display device displaying a list of the received device information; in response to a user's instruction to select one of the devices for a manual via the list, the manual display device sending the device information of the selected device; and a manual server connected to the network for storing a plurality of manuals corresponding to the devices, the manual server searching among the manuals based upon the device information of the selected device received from the manual display device, the manual server sending the searched manual to the manual display device, wherein the manual display device displays the searched manual from the manual server, in case the user specifying an output format, the manual display device sends the output format with the selected device information to the manual server, in case the user specifying a search string, the manual display device sends the search string with the selected device information to the manual server, in case the output format being sent from the manual display device, the manual server converts the searched manual based upon the output format, in case the search string being sent from the manual display device, the manual server searches among the manuals based upon the device information and the search string, in case a plurality of matching portions found based upon the search string in the searched manual, the manual server sends the manual display device a list of previews of the matching portions, in case the list of the preview of the matching portions being sent from the manual server, the manual display device displays the list of the preview of the matching portions, in case the user specifying one of the displayed list of the reviews of the matching portions, the manual display device sends the specified preview to the manual server, based upon the specified preview sent from the manual display device, the manual server sends a corresponding portion of the searched manual to the manual display device, the manual display device displays the poriton of the searched manual that sent from said manual server and corresponds to the specified preview.

According to a second aspect of the current invention, a method of selecting a manual for various elements in a network, including the steps of: connecting a manual display device to the network; connecting devices that are connected to the network and each of the devices storing its device information; connecting a manual server to the network for storing a plurality of manuals corresponding to the devices; requesting the devices for the device information from the manual display device; receiving the device information from the devices at the manual display device at the manual display device; displaying a list of the received device information at the manual display device; sending from the manual display device the device information of the selected device in response to a user's instruction to select one of the devices for a manual via the list; searching at the manual server among the manuals based upon the device information of the selected device received from the manual display device; sending from the manual server the searched manual to the manual display device; and displaying at the manual display device the searched manual from the manual server, in case the user specifying an output format, the manual display device sends the output format with the selected device information to the manual server, in case the user specifying a serach string, the manual display device sends the search string with the selected device information to the manual server, in case the output format being sent from the manual display device, the manual server converts the searched manual based upon the output format, in case the search string being sent fom the manual display device, the manual server searches among the manuals based upon the device information and the search string, in case a plurality of matching portions found based upon the search string in the searched manual, the manual server sends the manual display device a list of previews of the matching portions, in case the list of the preview of the matching portions being sent from the manual server, the manual display device displays the list of the preview of the matching portions, in case the user specifying one of the displayed list of the previews of the matching portions, the manual display device sends the specified preview to the manual server, bsed upon the specified preview sent from the manual display device, the manual server sends a corresponding portion of the searched manual to the manual display device, the manual display device displays the portion of the searched manual that sent from the manual server and corresponds to the specified preview.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 2 is a table illustrating one example of the device information that the information obtaining unit has collected from the devices and placed in a table format.

FIG. 5 shows an exemplary table content of a reference manual that is stored in the device manual storage unit according to the current invention.

Figure 6:
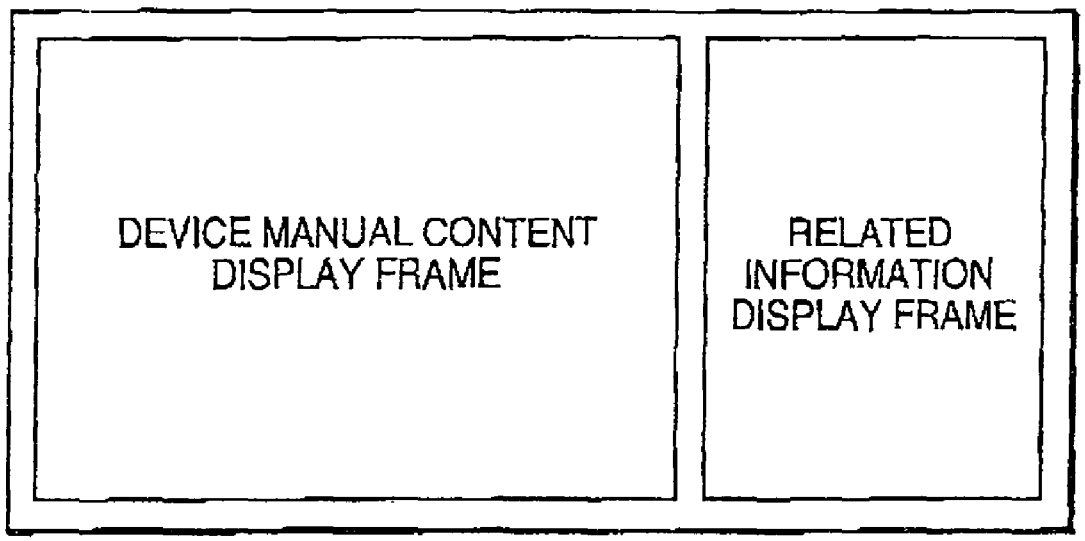

to FIG. 6 is an exemplary display in a preferred embodiment of the display unit according to the current invention.

Figure 7:
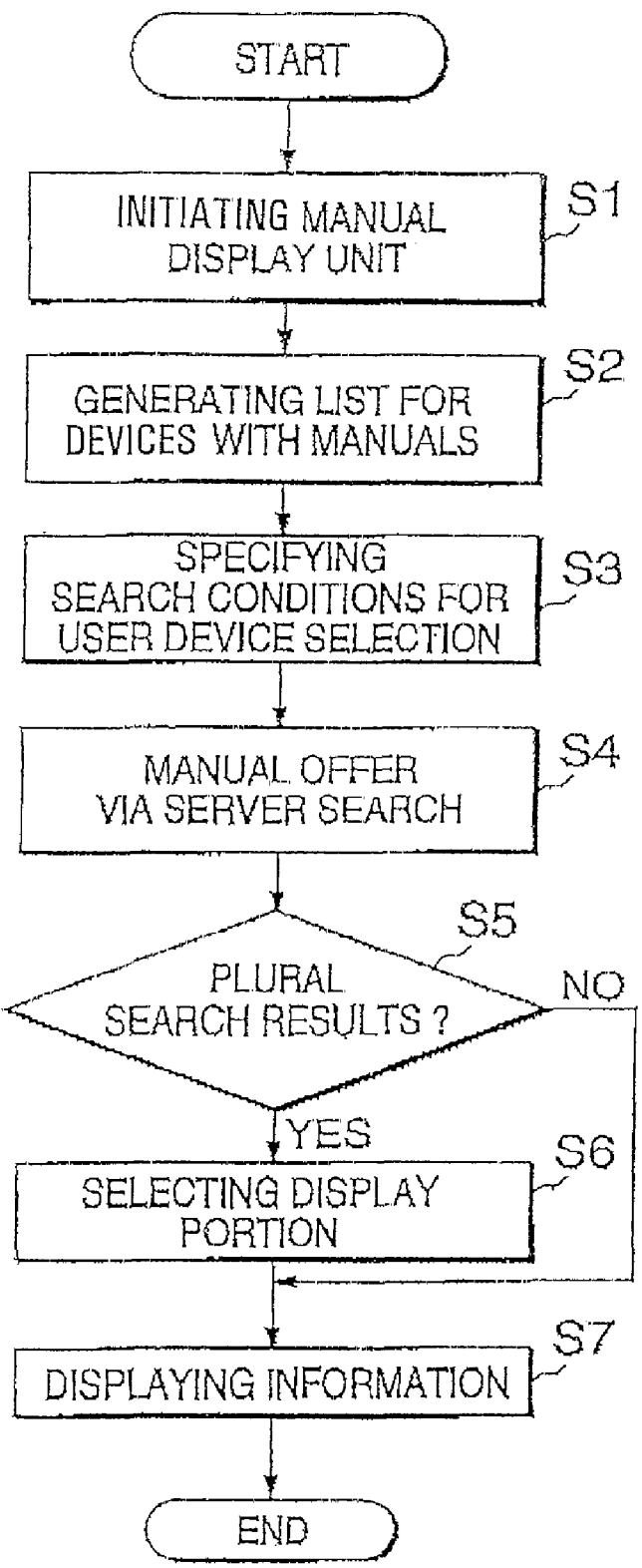

FIG. 7 is a flow chart illustrating steps involved in a preferred process of searching the manual according to the current invention.

Figure 8:
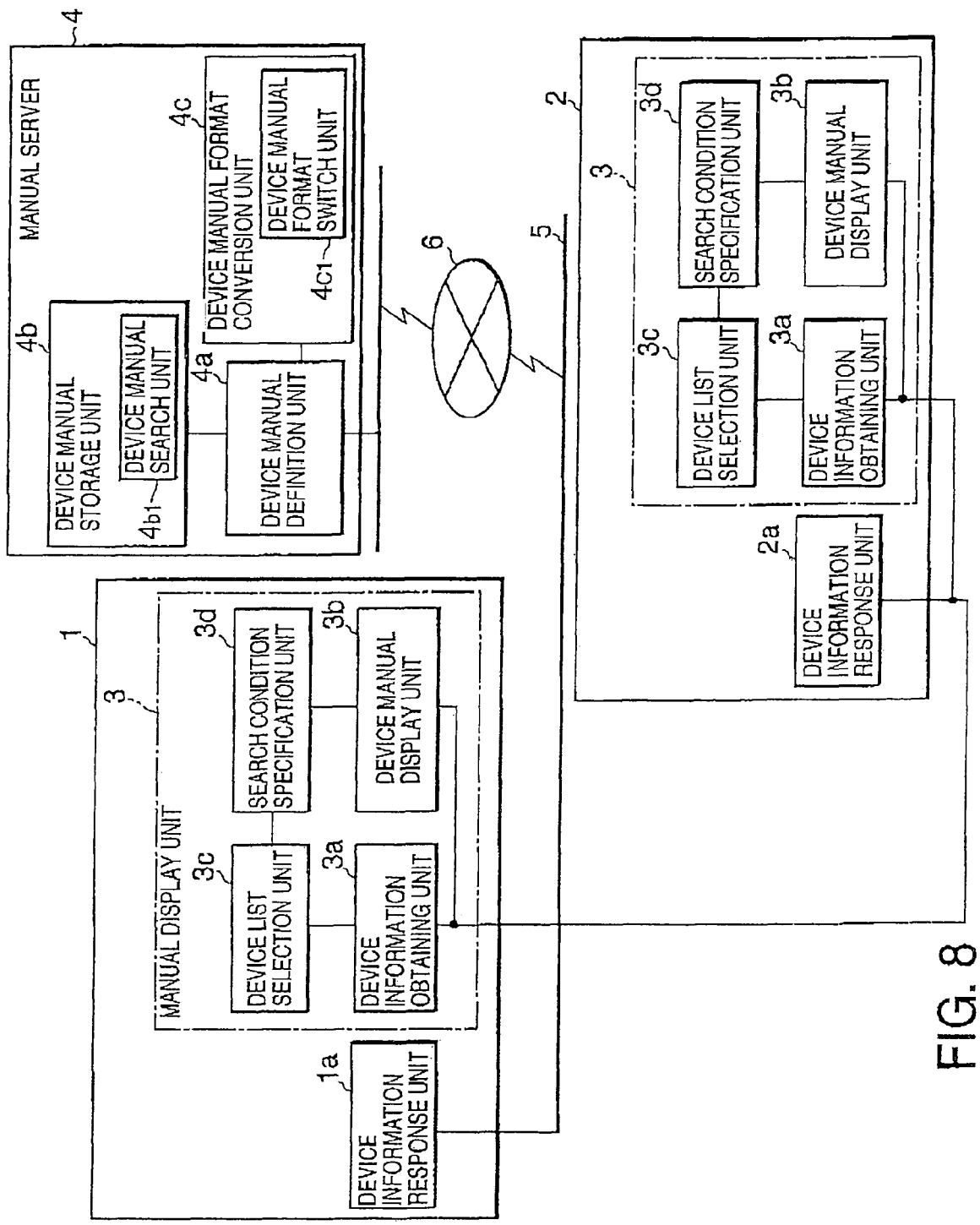

FIG. 8 is a block diagram illustrating an overall view of a second preferred embodiment of the reference manual search system according to the current invention.

DETAILED DESCRIPTION OF THE PREFERRED EMBODIMENT(S)

Based upon incorporation by external reference, the current application incorporates all disclosures in the corresponding foreign priority document (JP2001-205520) from which the current application claims priority.

Figure 1:
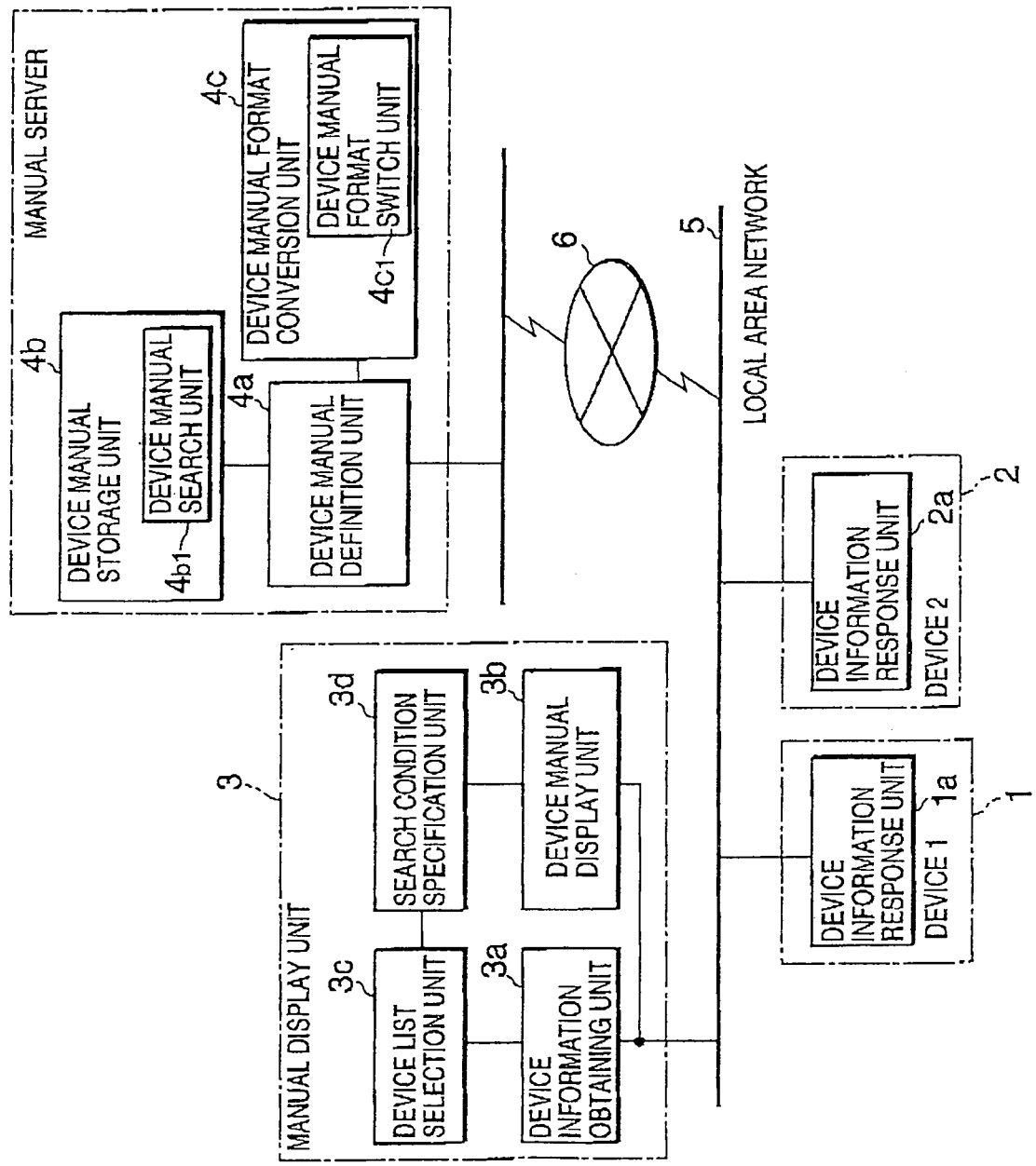
FIG. 1 is a block diagram illustrating an overall view of one preferred embodiment of the reference manual search system according to the current invention.

Referring now to the drawings, wherein like reference numerals designate corresponding structures throughout the views, and referring in particular to FIG. 1, a block diagram illustrates an overall view of one preferred embodiment of the reference manual search system according to the current invention. The first preferred embodiment includes a first device 1, a second device 2, a manual display unit 3 and a manual server 4. The first device 1 and the second device 2 are connected to a common local network 5 and perform a predetermined function. The first device 1 and the second device 2 include not only information processing devices such as personal computers, printers and scanners but also any office equipment such as copiers and fax machines. Furthermore, the first device 1 and the second device 2 also include home appliances such as audio visual equipment and washers. The first device 1 and the second device 2 are a target for the reference manual search according to the current invention. The manual display unit 3 displays a reference manual and is typically implemented by a personal computer. By directly operating the manual display unit 3, the user sees a desired reference manual for a specified device. The first device 1 and the second device 2 are connected to the manual display unit 3 via the common local network 5 in the bus format.

In the preferred embodiment of the reference manual search system according to the current invention, the manual server or reference manual storage server 4 centrally stores reference manuals for various devices and or appliances. The manual server 4 communicates with the manual display unit 3 through a wide area network 6 such as the Internet and the intranet, which is connected to the local area network 5. That is, when the manual display unit 3 transmits a manual transmission request to the manual server 4 via the networks 5 and 6, the manual server 4 responds by transmitting a corresponding reference manual to the manual display unit 3. The preferred embodiment does not necessarily include the opposite request from the manual server 4 to the manual display unit 3. The manual display unit 3 further includes a device information obtaining unit 3a, a device manual display unit 3b, a device list-selection unit 3c and a search condition specification unit 3d. The manual server 4 further includes a device manual definition unit 4a, a device manual storage unit 4b and a device manual format conversion unit 4c. The device manual storage unit 4b further includes a device manual search unit 4b1 whereas the device manual format conversion unit 4c includes a device manual format switch unit 4c1.

Still referring to FIG. 1, in the preferred embodiment, the first device 1 and the second device 2 respectively further include a device information response unit 1a and 2a. When the first device 1 or the second device 2 receives an inquiry request for the device information from the manual display unit 3, the device information response units 1a and 2a respond to the request. The device information inquiry request includes predetermined key information for a key search to obtain a corresponding manual from the manual server 4 and device selection information for a user selection list to be displayed on the device list selection unit 3c, which is equipped in the manual display unit 3. For example, the above search key information to be used as a key for the manual server 4 includes a device code that uniquely specifies a device product name or a device product type and a manufacturer code that uniquely specifies a device manufacturer. The search key information is not limited to the above example and includes any other information that is used to specify a desired reference manual for a specified device. Similarly, one example of the device selection information for a user selection list to be displayed on the device list selection unit 3c includes a product name that indicates an unique product name and corresponds to a predetermined one of the product code, a manufacturer name that specifies a manufacturer and corresponds to a predetermined one of the manufacturer code as well as a product type that classifies products into groups such as copiers and washers. The device selection information is not limited to the above example and includes any other information that is used by a user to select a desired device.

The device information obtaining unit 3a in the manual display unit 3 broadcasts or multicasts a device information inquiry request in the local area network 5. A device receives the broadcast and determines whether or not the device inquiry request is addressed to the received device itself. Upon acknowledging the device inquiry request, the device transmits its own device selection information to the device information obtaining unit 3a in the manual display unit 3 based upon a predetermined protocol. The information obtaining unit 3a is activated when the manual display unit 3 is initiated. To obtain the device information for a user-specified device for later displaying the corresponding device manual, the information obtaining unit 3a transmits the above described device information inquiry request onto the local area network 5. As described above, the information obtaining unit 3a broadcasts or multicasts the device information inquiry request. When a device identifies that the device information inquiry request is addressed to the device, the corresponding device information response unit such as 1a and 2a responds by transmitting its own device information to the information obtaining unit 3a of the manual display unit 3 in accordance with a predetermined protocol. Thus, the device list selection unit 3c collects the device information from the responding device. Alternatively, when the devices are connected to the network, the device information of each device is individually registered with the manual server 4 so that a device list is generated for the devices that are connected to the network.

Now referring to FIG. 2, a table illustrates one example of the device information that the information obtaining unit 3a has collected from the devices and placed in a table format. The collected device information includes a device selection information group and a search key information group. The device selection information group further includes product names 21, manufacturer names 22 and product types 23. The search key information group further includes device or product codes 24 and manufacturer codes 25. For example, the product types 23 include predetermined types such as washing machines and microwave ovens. Similarly, the product names 21 include predetermined names such as product name 1 and product name 2. The manufacturer names 22 include predetermined names such as Company A and Company B. The device code 24 and the manufacturer code 25 both respectively correspond to a unique one of the product names 21 and a unique one of the manufacturer names 22. For example, a device code, 123456 in the device code 24 corresponds to a product name, Product Name 1 in the product names 21. Similarly, a manufacturer code, MakerB.com in the manufacturer code 25 corresponds to a manufacturer name, Company B in the manufacturer names 22.

Referring back to FIG. 1, the device list selection unit 3c and the search condition specification unit 3d are generally used to select a user-specified device. The device list selection unit 3c extracts only the device selection information from the device information and displays a list of the device selection information for a user to select a device. Thus, the device list selection unit 3c provides a selection means to select a device whose corresponding reference manual is displayed. On the other hand, the search condition specification unit 3d is used to search a particular portion in the device manual that has been specified based upon a selected product name from the device list selection unit 3c. The search conditions are inputted in natural language. Alternatively, the search conditions are specified in a predetermined search equation that includes certain key connective words such as AND and OR. Finally, the device manual display unit 3b transmits to the manual server 4 the search information that has been specified by the device list selection unit 3c and the search condition specification unit 3d. The search key information for the device that is specified by the device list selection unit 3c further includes the device codes 24 and the manufacturer codes 25. In addition, the search key information further includes the search condition that has been specified by the search condition specification unit 3d and the output location as shown in FIG. 3 such as a screen or a printer that has been specified via the device list selection unit 3c.

Figure 3:
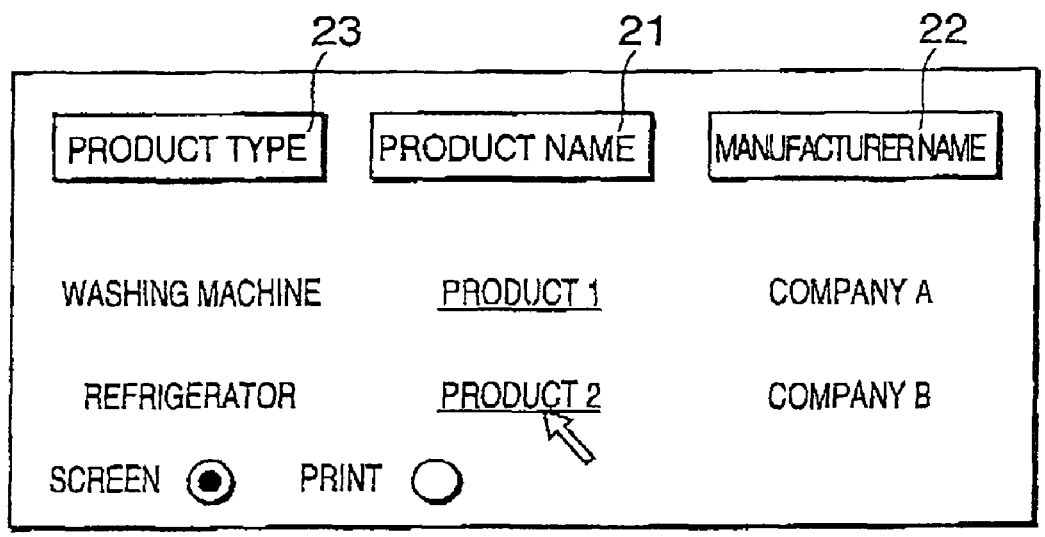
FIG. 3 is a diagram illustrating an exemplary display screen content of the device list selection unit according to the current invention.

Now referring to FIG. 3, a diagram illustrates an exemplary display screen content of the device list selection unit 3c according to the current invention. The display screen includes a first column of the product type 23, a second column of the product name 21 and the third column of the manufacturer name. The product type 23 includes a selection of washing machines and refrigerators. The product name 21 includes a selection of Product 1 and Product 2. The manufacturer name 22 includes a selection of Company A and Company B. Lastly, the display screen includes an output selection of a screen and a printer where the search result or the output is directed. For example, from the displayed list of the device selection information, the user selects a product name from the product name list 21 in order to display a corresponding reference manual via an input device such as a mouse. Similarly, the user clicks a screen button to display the selected reference manual on the screen while he or she clicks a print button to print out the selected reference manual. In the example in FIG. 3, the user has selected a reference manual for the Product 2 in the product name column 21 to be displayed on the screen as respectively indicated by the arrow and the highlighted button.

Figure 4:
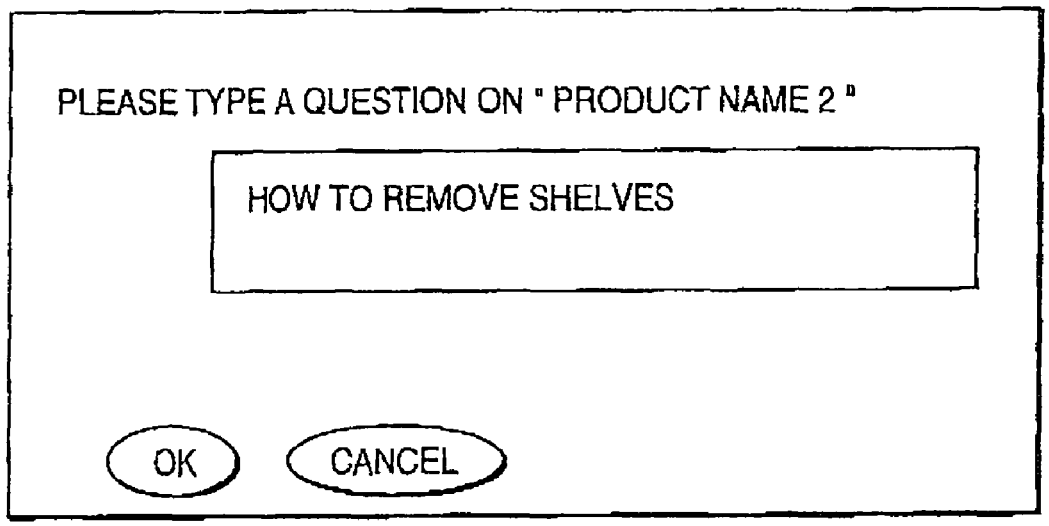
FIG. 4 is a diagram illustrating an exemplary user interface screen for the search condition specification unit according to the current invention.

FIG. 4 is a diagram illustrating an exemplary user interface screen for the search condition specification unit 3d according to the current invention. For example, after the user has selected a reference manual for the Product 2 such as a refrigerator in the product name column 21 as shown in FIG. 3, the user now further specifies a detailed condition that is related to "how to remove shelves" in natural language as shown in FIG. 4. As the user clicks the OK button on the same screen user-interface, the above specified "how to remove shelves" is inputted as a search condition. Based upon the search condition, a portion that contains the relevant information is searched in the reference manual for Product 2.

Once again, referring back to FIG. 1, the manual server 4 further includes a device manual definition unit 4a, a device manual storage unit 4b and a device manual format conversion unit 4c. The device manual storage unit 4b stores the reference manuals of predetermined devices as a whole as well as portions. Using the device manual storage unit 4b, a particular one of the reference manuals is initially identified as a whole manual to be searched based upon the search key information such as a combination of the product code 24 and a manufacturer code 25. The portions are stored in divided groups based upon a search unit such as a chapter and a paragraph. The device manual storage unit 4b further includes a device manual search unit $4b_1$, which searches a particular unit among the divided groups based the search conditions. That is, the device manual search unit 4b, in the above device manual storage unit 4b has a search function to search only a relevant portion of the device manual in the above device manual storage unit 4b based upon the search conditions from the manual display unit 3. When a plurality of headings matches the above specified search condition, a list of the matching heading is returned to the manual display unit 3 for tentatively displaying the list. A user selects a desired heading from the displayed list, and the selected information is transmitted to the manual server 4. As a result, the corresponding portion of the manual for the selected heading is finally sent to the manual display unit 3. When the search condition specification unit 3d fails to specify any of the above described partial search conditions, the manual server 4 returns to the manual display unit 3 the whole manual based upon the manual search information. The manual server 4 returns to the manual display unit 3 the specified reference manual information in a predetermined format such as Hyper-Text Markup Language (HTML). When the manual server 4 returns more than a single portion of a reference manual as a search result in response to a search condition that has been specified by the search condition specification unit 3d, the device manual display unit 3b displays the above candidates by its chapter or paragraph headings. The user then further specifies one of the candidate headings, and the device manual display unit 3b displays a portion that corresponds to the selected heading.

FIG. 5 shows an exemplary table content of a reference manual that is stored in the device manual storage unit 4b according to the current invention. The manual is assumed to have chapters and paragraphs, and the storage locations or addresses of these subdivided portions of the manual are placed in a list. The exemplary table contains a manufacturer code column, a device code column, a whole manual column, a first partial manual column, a second partial manual column, ... a Nth partial manual column. The manufacturer code column and the device code column respectively contain manufacturer code 25 and device code 24. The whole manual column, the first partial manual column, the second partial manual column, ... the Nth partial manual column respectively contain an address at which each of the specified portions of the manual is stored in the device manual storage unit 4b. The specified portion is determined by a combination of the above described search conditions, and the corresponding chapters and paragraphs are referenced for desired viewing of the partial manual.

In the preferred embodiment, the above device manuals are written in eXensible Markup Language (XML) rather than Hyper Text Markup Language (HTML). The device manual format conversion unit 4c provides a means for processing a portion or a whole of the device manual from the device manual storage unit 4b. That is, for example, the device manual is converted into a predetermined format that is convenient for a user based upon the information from the manual display unit 3 such as the display specification information. One example of the processing is to edit and generate the screen display data. To display on the screen, the information is displayed in HTML. In consideration for the screen display size, the length of one screen is desirably limited by dividing data into groups. Since the device manual itself is written in XML, the manual data is converted into HTML via proper conversion script. Another example of processing includes the generation of the printing data. To print out, the data is desirably organized into a single data structure as in HTML or a page structure as in portable document format (PDF). Thus, a conversion process is performed by a proper script or a layout engine if necessary. The device manual format conversion unit 4c further includes a device manual format switch unit $4c_1$. Based upon the control by the device manual format switch unit $4c_1$ in the device manual format conversion unit 4c, the screen display format and the print format are respectively switched in response to a user specification.

Now referring to FIG. 6, an exemplary display is shown in a preferred embodiment of the display unit according to the current invention. One more example of the processing is a conversion method of adding to the related product information or maintenance information that is defined in the device manual definition unit 4a. The searched manual information and the above additional information are edited to generate the HTML data to be outputted for display on the same screen by using the frame function of HTML. In other words, the device manual format conversion unit 4c converts the searched manual information and the related/additional information into a predetermined format which enable to display on the same screen. For example, the related or additional information includes information on the products and services or the new products that are related to the searched product. The exemplary related or additional information also includes information on the maintenance such as warranty on parts and recall notices. The above described information is displayed in an exemplary screen display which includes a device manual content display frame and a related information display frame. By using the HTML frame function, the manual content is displayed in the left frame while the related or additional information is displayed in the right frame.

The device manual definition unit 4a identifies the product code 24 and the manufacture code 25 in the search key information from the manual display unit 3 via wide area network. If the search key information contains correct information, the search key information is passed to the device manual storage unit 4b. Furthermore, if any search condition is received, the search condition is simultaneously sent to device manual storage unit 4b. Subsequently, the device manual definition unit 4a transfers to the manual display unit 3 the device manual or the partial device manual that has been returned from the device manual storage unit 4b. The device manual definition unit 4a is implemented as a World Wide Web (WWW) server. The manual display unit 3 extracts a desired device manual by specifying a corresponding Universal Resource Locator (URL) that is given to the manual server 4.

Now referring to FIG. 7, a flow chart illustrates steps involved in a preferred process of searching the manual according to the current invention. In a step S1, a user activates the manual display unit 3 for displaying a device manual. The manual display unit 3 initiates the device information obtaining unit 3a to send a device inquiry or a device information request according to a predetermined protocol. Among the devices that are connected to the local area network 5, the device information obtaining unit 3a requests for the information for the devices whose manuals can be displayed. In a step S2, the selection information such as the product type information 23, the product name 21 and the manufacturer name 22 is generated and displayed in a list on the screen from the device information that has been returned from each of the devices. In a step S3, a user selects a particular one of the product names 23, which has been listed to specify a device whose reference manual is to be displayed. In the step S3, the user further specifies a search condition for limiting the display detail search information as well as a display condition for limiting an output location such as screen and printout. In a step S4, via a wide area network that is connected to the local area network, the manual display unit 3 sends search key information, search conditions and a display method to the manual server 4 for specifying a device whose reference manual is to be displayed. The manual server 4 searches for a matching manual based upon the search key information and further searches for a matching portion within the matching manual if there is a search condition. When the search result contains more than one manual or one portion in a step S5, the preferred process proceeds to a YES path to a step S6. In the step S6, the manual server 4 returns to the manual display unit 3 a list of headings such as chapter or paragraph headings in a single reference manual. The manual display unit 3 displays the list, and the user selects from the list in the step S6. The selected heading information is sent to the manual server 4. In response, the manual server 4 returns to the manual display unit 3 via wide area network a portion of the manual such as a corresponding chapter or paragraph based upon the selected heading information. On the other hand, when there is no search condition for a manual stored in the device manual storage unit 4b or the search result is singular regardless of the search condition, the preferred process proceeds to the NO option in the step S5. In the above NO path, the searched device manual or a portion thereof is returned to the manual display unit 3 via the wide area network 6. In a step S7, the manual display unit 3 outputs to a specified output location the returned portion of the manual that has been sent to the device manual display unit 3b. The specified output location includes a screen and a printout. From the manual server 4, the device manual format conversion unit 4c has edited the output data for either the screen display or the print out.

Still referring to FIG. 7, certain steps are modified in an alternative process of searching the manual according to the current invention. In the step S1, a user activates the manual display unit 3 for displaying a device manual. The manual display unit 3 sends a device inquiry or a device information request to the manual server 4 according to a predetermined protocol. When each of the devices is connected to the local area network 5, the device registers its selection information with the manual server 4 for later displaying its manual upon request. The selection information includes the product type information 23, the product name 21 and the manufacturer name 22, and a list is generated in the step S2 in response to the device inquiry or the device information request. The generated list is returned to the display unit 3 from the manual server 4.

Now referring in particular to FIG. 8, a block diagram illustrates an overall view of a second preferred embodiment of the reference manual search system according to the current invention. In general, the second preferred embodiment is substantially the same as the first preferred embodiment as described with respect to FIG. 1. The second preferred embodiment includes a first device 1, a second device 2, a manual display unit 3 that has been incorporated in each of the first and second devices and a manual server 4. The first device 1 and the second device 2 are connected to a common local network 5 and perform a predetermined function. The first device 1 and the second device 2 are not only information processing devices such as personal computers, printers and scanners but also any office equipment such as copiers and fax machines. Furthermore, the first device 1 and the second device 2 also include home appliances such as audio visual equipment and washers. The first device 1 and the second device 2 are a target for the reference manual search according to the current invention. The incorporated manual display unit 3 displays any specified reference manual that is stored in the manual server 4. By directly operating the manual display unit 3, the user sees a desired reference manual for a specified device.

In the second preferred embodiment of the reference manual search system according to the current invention, the manual server or reference manual storage server 4 centrally stores reference manuals for various devices and or appliances. The manual server 4 communicates with the manual display unit 3 through a wide area network 6 such as the Internet and the intranet, which is connected to the local area network 5. That is, when the manual display unit 3 transmits a manual transmission request to the manual server 4 via the networks 5 and 6, the manual server 4 responds by transmitting a corresponding reference manual to the manual display unit 3 of the corresponding device. The second preferred embodiment does not necessarily include the opposite request from the manual server 4 to the manual display unit 3. The manual display unit 3 further includes a device information obtaining unit 3a, a device manual display unit 3b, a device list-selection unit 3c and a search condition specification unit 3d. The manual server 4 further includes a device manual definition unit 4a, a device manual storage unit 4b and a device manual format conversion unit 4c. The device manual storage unit 4b further includes a device manual search unit 4b1 whereas the device manual format conversion unit 4c includes a device manual format switch unit 4c1.

Still referring to FIG. 8, in the second preferred embodiment, the first device 1 and the second device 2 respectively further include a device information response unit 1a and 2a. When the first device 1 or the second device 2 receives an inquiry request for the device information from the manual display unit 3, the device information response units 1a and 2a respond to the request. The device information inquiry request includes predetermined key information for a key search to obtain a corresponding manual from the manual server 4 and device selection information for a user selection list to be displayed on the device list selection unit 3c, which is equipped in the manual display unit 3. For example, the above search key information to be used as a key for the manual server 4 includes a device code that uniquely specifies a device product name or a device product type and a manufacturer code that uniquely specifies a device manufacturer. The search key information is not limited to the above example and includes any other information that is used to specify a desired reference manual for a specified device. Similarly, one example of the device selection information for a user selection list to be displayed on the device list selection unit 3c includes a product name that indicates an unique product name and corresponds to a predetermined one of the product code, a manufacturer name that specifies a manufacturer and corresponds to a predetermined one of the manufacturer code as well as a product type that classifies products into groups such as copiers and washers.

The device selection information is not limited to the above example and includes any other information that is used by a user to select a desired device. The device information obtaining unit 3a in the manual display unit 3 broadcasts or multicasts a device information inquiry request in the local area network 5. A device receives the broadcast and determines whether or not the device inquiry request is addressed to the received device itself. Upon acknowledging the device inquiry request, the devices 1 and 2 transmit its own device selection information to the device information obtaining unit 3a in the manual display unit 3 based upon a predetermined protocol. The information obtaining unit 3a is activated when the manual display unit 3 is initiated. To obtain the device information for a user-specified device for later displaying the corresponding device manual, the information obtaining unit 3a transmits the above described device information inquiry request onto the local area network 5. As described above, the information obtaining unit 3a broadcasts or multicasts the device information inquiry request. When a device identifies that the device information inquiry request is addressed to the device, the corresponding device information response unit such as 1a and 2a responds by transmitting its own device information to the information obtaining unit 3a of the manual display unit 3 in accordance with a predetermined protocol. Thus, the device list selection unit 3c collects the device information from the responding devices. As an alternative embodiment, the device information response units 1a and 2a are incorporated in the display unit 3. However, the content of the information that the device information response units 1a and 2a transmits to the manual server is respectively unique to the devices 1 and 2 while the components in the display unit 3 are identical in the devices 1 and 2.

As described above, the device manual search system according to the current requires only simple operations and displays a whole or partial manual for the desired device in a specified format. The above description includes various implementations for the manual search system according to the current invention. The implementations include a method for performing the above steps or computer programs that perform the above described steps.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A system for connecting various elements via a network, comprising:

devices connected to the network for each storing device information;

a manual display device connected to the network for requesting to said devices the device information; said manual display device receiving the device information from said devices; said manual display device displaying a list of said received device information; in response to a user's instruction to select one of said devices for a manual via the list, said manual display device sending the device information of said selected device; and a manual server connected to the network for storing a plurality of manuals corresponding to said devices, said manual server searching among the manuals based upon the device information of said selected device received from said manual display device, said manual server sending the searched manual to said manual display device, wherein said manual display device displays the searched manual from said manual server, in case the user specifying an output format, said manual display device sends the output format with the selected device information to said manual server, in case the user specifying a search string, said manual display device sends the search string with the selected device information to said manual server, in case the output format being sent from said manual display device, said manual server converts the searched manual based upon the output format, in case the search string being sent from said manual display device, said manual server searches among the manuals based upon the device information and the search string, in case a plurality of matching portions found based upon the search string in the searched manual, said manual server sends said manual display device a list of previews of the matching portions, in case the list of the preview of the matching portions being sent from said manual server, said manual display device displays the list of the preview of the matching portions, in case the user specifying one of the displayed list of the previews of the matching portions, said manual display device sends the specified preview to said manual server, based upon the specified preview sent from said manual display device, said manual server sends a corresponding portion of the searched manual to said manual display device, said manual display device displays the portion of the searched manual that sent from said manual server and corresponds to the specified preview.

2. The system for connecting various elements via a network according to claim 1 wherein the search string includes natural language.

3. The system for connecting various elements via a network according to claim 1 wherein the search string includes condition indicators.

4. A method of selecting a manual for various elements in a network, comprising the steps of:

connecting a manual display device to the network;

connecting devices that are connected to the network and each of the devices storing its device information;

connecting a manual server to the network for storing a plurality of manuals corresponding to the devices;

requesting the devices for the device information from the manual display device;

receiving the device information from the devices at the manual display device at the manual display device;

displaying a list of the received device information at the manual display device;

sending from the manual display device the device information of the selected device in response to a user's instruction to select one of the devices for a manual via the list;

searching at the manual server among the manuals based upon the device information of the selected device received from the manual display device;

sending from the manual server the searched manual to the manual display device; and displaying at the manual display device the searched manual from the manual server, in case the user specifying an output format, the manual display device sends the output format with the selected device information to the manual server, in case the user specifying a search string, the manual display device sends the search string with the selected device information to the manual server, in case the output format being sent from the manual display device, the manual server converts the searched manual based upon the output format, in case the search string being sent from the manual display device, the manual server searches among the manuals based upon the device information and the search string, in case a plurality of matching portions found based upon the search string in the searched manual, the manual server sends the manual display device a list of previews of the matching portions, in case the list of the preview of the matching portions being sent from the manual server, the manual display device displays the list of the preview of the matching portions, in case the user specifying one of the displayed list of the previews of the matching portions, the manual display device sends the specified preview to the manual server, based upon the specified preview sent from the manual display device, the manual server sends a corresponding portion of the searched manual to the manual display device, the manual display device displays the portion of the searched manual that sent from the manual server and corresponds to the specified preview.

5. The method of selecting a manual for various elements in a network according to claim 4 wherein the search string includes natural language.

6. The method of selecting a manual for various elements in a network according to claim 4 wherein the search string includes condition indicators.

* * * * *